US011920669B2

(12) United States Patent
Li et al.

(10) Patent No.: US 11,920,669 B2
(45) Date of Patent: Mar. 5, 2024

(54) GEARBOX WITH BEARING CONFIGURATION FOR RAIL VEHICLE

(71) Applicant: CRRC QISHUYAN INSTITUTE CO., LTD., Jiangsu (CN)

(72) Inventors: Feng Li, Jiangsu (CN); Hongbo Que, Jiangsu (CN); Hui Zhao, Jiangsu (CN); Hua Li, Jiangsu (CN); Siqin Jin, Jiangsu (CN)

(73) Assignee: CRRC QISHUYAN INSTITUTE CO., LTD., Jiangsu (CN)

( * ) Notice: Subject to any disclaimer, the term of this patent is extended or adjusted under 35 U.S.C. 154(b) by 120 days.

(21) Appl. No.: 17/418,594

(22) PCT Filed: Oct. 29, 2019

(86) PCT No.: PCT/CN2019/113951
§ 371 (c)(1),
(2) Date: Dec. 2, 2021

(87) PCT Pub. No.: WO2020/134510
PCT Pub. Date: Jul. 2, 2020

(65) Prior Publication Data
US 2022/0333676 A1    Oct. 20, 2022

(30) Foreign Application Priority Data
Dec. 28, 2018   (CN) .......................... 201811624264.9

(51) Int. Cl.
*F16H 57/02*   (2012.01)
*B61C 9/38*    (2006.01)
(Continued)

(52) U.S. Cl.
CPC ............. *F16H 57/021* (2013.01); *B61C 9/38* (2013.01); *F16C 33/6659* (2013.01);
(Continued)

(58) Field of Classification Search
CPC ........ F16H 1/06; F16H 57/021; F16H 57/029; F16H 57/04; F16H 57/0424;
(Continued)

(56) References Cited

U.S. PATENT DOCUMENTS 2,327,205 A * 8/1943 Mierley .................... B61C 9/30
277/369
3,763,961 A * 10/1973 Casale ...................... F16N 7/26
184/11.2
(Continued)

FOREIGN PATENT DOCUMENTS

CN     202451797 U    9/2012
CN     103711879 A  * 4/2014   .......... F16H 57/027
(Continued)

OTHER PUBLICATIONS

Machine translation of CN 106195127 A obtained on Jan. 12, 2023.*
(Continued)

*Primary Examiner* — Adam D Rogers
(74) *Attorney, Agent, or Firm* — CANTOR COLBURN LLP (57) ABSTRACT

The present disclosure provides a gearbox of a rail vehicle, which belongs to the technical field of gear transmission. The gearbox of the present disclosure comprises a driving shaft, a driven shaft, a first bearing seat and a second bearing seat; the gearbox further comprises: a first roller bearing, a ball bearing, a bearing inner retaining ring and a bearing outer retaining ring for drainage, which are arranged between the first bearing seat and the driving shaft; wherein, the bearing inner retaining ring and the bearing outer retaining ring are provided between the first roller bearing and the ball bearing along an axial direction of the driving shaft, and a first drainage channel is provided on the bearing outer retaining ring, a second drainage channel is provided on the
(Continued)

first bearing seat; wherein, the lubricating oil can be guided into the first roller bearing and the ball bearing from the outside of the first bearing seat through the second drainage channel and the first drainage channel in sequence. The present disclosure can greatly improve the lubricating performance of the first roller bearing and the ball bearing on the driving shaft of the gearbox, and is particularly suitable for low-temperature working conditions.

15 Claims, 5 Drawing Sheets

(51) Int. Cl.
```
F16C 33/66      (2006.01)
F16H 1/06       (2006.01)
F16H 57/021     (2012.01)
F16H 57/029     (2012.01)
F16H 57/04      (2010.01)
F16H 57/031     (2012.01)
```
(52) U.S. Cl.
CPC ....... *F16H 57/029* (2013.01); *F16H 57/0424* (2013.01); *F16H 57/0471* (2013.01); *F16H 1/06* (2013.01); *F16H 57/031* (2013.01)

(58) Field of Classification Search
CPC .... F16H 57/0471; F16H 57/031; F16C 19/54; F16C 19/541; F16C 33/6637; F16C 33/6659; B61C 9/38
See application file for complete search history.

(56) References Cited

U.S. PATENT DOCUMENTS

| | | | | |
|---|---|---|---|---|
| 7,500,311 B2* | 3/2009 | Shimomura | ............ | F16C 19/54 |
| | | | | 184/7.4 |
| 7,594,757 B2* | 9/2009 | Verhaegen | .......... | F16C 33/6674 |
| | | | | 384/313 |
| 11,378,126 B2* | 7/2022 | Chumokhvalov | .. | F16C 33/3887 |

FOREIGN PATENT DOCUMENTS

| | | | | | |
|---|---|---|---|---|---|
| CN | 104329447 | A | * | 2/2015 | ............ F16C 37/007 |
| CN | 205446632 | U | | 8/2016 | |
| CN | 106195127 | A | | 12/2016 | |
| CN | 106481792 | A | | 3/2017 | |
| CN | 108443417 | A | * | 8/2018 | ......... F16D 33/6659 |
| CN | 108443469 | A | * | 8/2018 | |
| CN | 108612834 | A | * | 10/2018 | .......... F16C 33/6659 |
| DE | 19930804 | A1 | | 1/2001 | |
| DE | 102009018786 | A1 | * | 10/2009 | ............. F16C 19/54 |
| WO | WO-2016124023 | A1 | * | 8/2016 | ............. B60T 7/124 |

OTHER PUBLICATIONS

Machine translation of WO 2016/124023 A1 obtained on Jan. 18, 2023.*

Machine translation of CN 108443469 A obtained on Jan. 19, 2023.*

IPIN Examination Report for corresponding IN Application No. 202147033141; dated, Sep. 8, 2021.

* cited by examiner

A-A section

FIG. 3

B-B section

C-C section

FIG. 8

GEARBOX WITH BEARING CONFIGURATION FOR RAIL VEHICLE

CROSS REFERENCE TO RELATED APPLICATIONS

This is the U.S. national stage of application No. PCT/CN2019/113951, filed on Oct. 29, 2019. Priority under 35 U.S.C. § 119(a) and 35 U.S.C. § 365(b) is claimed from Chinese Application No. 201811624264.9, filed Dec. 28, 2018, the disclosure of which is also incorporated herein by reference.

TECHNICAL FIELD

The invention belongs to the technical field of gear transmission of rail vehicles, and relates to a gearbox of a rail vehicle, in particular to a bearing arrangement of an active bearing of a gearbox of a rail vehicle.

BACKGROUND

The gearbox is a key transmission component in the rail vehicle, which can realize the transmission of the power output by the traction motor to the wheels, thereby driving the rail vehicle forward.

A driven shaft corresponding to an axle of the wheel and a driving shaft corresponding to the output shaft of the motor are generally provided inside the gearbox, the driving shaft is generally selected as a gear shaft, which has a small gear on it and the rotation speed is relatively fast during transmission, the driven shaft is arranged with a driven gear with a relatively large diameter, which can also be called a large gear, the large gear can mesh with the small gear and the rotation speed is relatively slow. In some cases, an intermediate shaft and transmission gear of intermediate stage can also be arranged between the driving shaft and the driven shaft.

For the driving shaft, it is generally installed on a box body of the gearbox through a bearing seat, and a bearing assembly is arranged between the bearing seat and the driving shaft. Because the driving shaft is a relatively high-speed rotating component, especially when the gearbox is applied to high-speed Electric Multiple Units (EMUs), the bearing rotates very fast, and the lubrication of the bearing becomes very important, therefore, the bearing arrangement of the driving shaft requires attention and consideration of lubricating performance of the bearing, especially the lubricating performance under all-weather conditions.

SUMMARY

One of the objectives of the present disclosure is to improve the lubricating performance of the bearing on the driving shaft of the gearbox of the rail vehicle.

In order to achieve the above objective or other objectives, the present disclosure provides the following technical solutions.

According to one aspect of the present disclosure, there is provided a gearbox for a rail vehicle, which comprises a driving shaft, a driven shaft, a first bearing seat for mounting and fixing the driving shaft, and a second bearing seat for mounting and fixing the driven shaft, the driving shaft drives the driven shaft to rotate through gear transmission; the gearbox further comprises:

A first roller bearing, a ball bearing, a bearing inner retaining ring and a bearing outer retaining ring for drainage, which are arranged between the first bearing seat and the driving shaft;

Wherein, the bearing inner retaining ring and the bearing outer retaining ring are provided between the first roller bearing and the ball bearing along an axial direction of the driving shaft, and a first drainage channel is provided on the bearing outer retaining ring, a second drainage channel is provided on the first bearing seat;

Wherein, the lubricating oil can be guided into the first roller bearing and the ball bearing from the outside of the first bearing seat through the second drainage channel and the first drainage channel in sequence.

According to the gearbox of an embodiment of the present invention, wherein, a third drainage channel is further provided on the first bearing seat, wherein the lubricating oil in the first roller bearing and the ball bearing can discharged into the gearbox through the third drainage channel.

According to the gearbox of another embodiment of the present invention or any one of the foregoing embodiments, wherein, an oil collecting groove is provided on the first bearing seat and/or a box body of the gearbox, and an opening of one end of the second drainage channel faces towards the oil collecting groove, the oil collecting groove is used for collecting the lubricating oil accumulated in the gearbox which is dragged by a large gear on the driven shaft when it rotates.

According to the gearbox of another embodiment of the present invention or any one of the foregoing embodiments, wherein, the third drainage channel is provided on a side opposite to the second drainage channel on the first bearing seat.

According to the gearbox of another embodiment of the present invention or any one of the foregoing embodiments, wherein, an opening of another end of the second drainage channel substantially faces towards the bearing outer retaining ring, and an inclination direction and/or angle of the second drainage channel is set so that the lubricating oil in the oil collecting groove automatically flows into the second drainage channel of the bearing outer retaining ring.

According to the gearbox of another embodiment of the present invention or any one of the foregoing embodiments, wherein, the bearing inner retaining ring and the bearing outer retaining ring are arranged concentrically, wherein, the bearing inner retaining ring is arranged corresponding to an inner ring of the first roller bearing and an inner ring of the ball bearing and separates them, and the bearing outer retaining ring is arranged corresponding to an outer ring of the first roller bearing and an outer ring of the ball bearing and separates them.

According to the gearbox of another embodiment of the present invention or any one of the foregoing embodiments, wherein, the bearing inner retaining ring, the inner ring of the first roller bearing and the inner ring of the ball bearing are all fixed on the driving shaft and rotate synchronously with the driving shaft.

According to the gearbox of another embodiment of the present invention or any one of the foregoing embodiments, wherein, the first drainage channel of the bearing outer retaining ring comprises a plurality of drainage holes; a shunt groove is also provided on the bearing outer retaining ring, the shunt groove is used to divide the lubricating oil flowing from the second drainage channel into the plurality of drainage holes substantially evenly.

According to the gearbox of another embodiment of the present invention or any one of the foregoing embodiments, wherein, the plurality of drainage holes are substantially evenly distributed in a circumferential direction of the bearing outer retaining ring.

According to the gearbox of another embodiment of the present invention or any one of the foregoing embodiments, wherein, the shunt groove is a groove provided on an outer circumferential surface of the bearing outer retaining ring.

According to the gearbox of another embodiment of the present invention or any one of the foregoing embodiments, wherein, the first roller bearing and the ball bearing mounted on the driving shaft are arranged at substantially the same height in a radial direction.

According to the gearbox of another embodiment of the present invention or any one of the foregoing embodiments, wherein, the bearing inner retaining ring is fixed on the wheel side of the driving shaft.

According to the gearbox of another embodiment of the present invention or any one of the foregoing embodiments, wherein, the ball bearing is arranged on an outer side relative to the first roller bearing along the axial direction of the driving shaft.

According to the gearbox of another embodiment of the present invention or any one of the foregoing embodiments, wherein, a second roller bearing is correspondingly arranged at a second end of the driving shaft close to a side of the motor.

According to the gearbox of another embodiment of the present invention or any one of the foregoing embodiments, wherein, the first roller bearing and the second roller bearing are cylindrical roller bearings.

According to the gearbox of another embodiment of the present invention or any one of the foregoing embodiments, wherein, which further comprises:

Bearing seal assemblies arranged outside a first end and a second end of the driving shaft respectively.

According to the gearbox of another embodiment of the present invention or any one of the foregoing embodiments, wherein, the rail vehicle is a high-speed Electric Multiple Unit (EMU).

According to another aspect of the present disclosure, a rail vehicle is provided, which uses any of the above-mentioned gearboxes.

Compared with the prior art, the gearbox of the present disclosure can greatly improve the lubricating performance of the first roller bearing and the ball bearing on the driving shaft of the gearbox, and is particularly suitable for low-temperature working conditions.

The above features and operations of the present invention will become more apparent from the following description and the accompanying drawings.

DESCRIPTION OF THE DRAWINGS

The above and other objects and advantages of the present invention will be more complete and clear from the following detailed description in conjunction with the accompanying drawings, wherein the same or similar elements are represented by the same reference numerals.

DETAILED DESCRIPTION

Hereinafter, the present invention will be explained more fully by referring to the accompanying drawings in which exemplary embodiments of the present invention are illustrated. However, the present invention can be implemented in different forms, and should not be interpreted as being limited to the embodiments given herein. The above-mentioned embodiments are intended to make the disclosure herein comprehensive and complete, so as to make the understanding of the protection scope of the present invention more comprehensive and accurate.

Terms such as "including" and "comprising" mean that, in addition to components that are directly and clearly stated in the specification and claims, the technical solution of the present invention does not exclude other components that are not directly or clearly stated.

Terms such as "first" and "second" do not indicate the order of the units or components in terms of time, space, size, etc., but are merely used to distinguish the units or components.

For the convenience of description, the x-direction, y-direction and z-direction are defined in the drawings, wherein the high direction of the gearbox is defined as the z-direction, and the axial direction of the driving shaft of the gearbox is defined as the y-direction (the positive direction of the y-direction is the direction from the motor side to the wheel side), the x-direction is perpendicular to the y-direction and the z-direction, where the central axis of the driving shaft and the driven shaft are on the xy-plane (the positive direction of the x-direction is the direction pointing from the central axis of the driving shaft to the center axis of the driven shaft). It should be understood that the definitions of these directions are used for relative description and clarification, which can be changed correspondingly according to changes in the orientation and/or shape of the gearbox.

Figure 1:
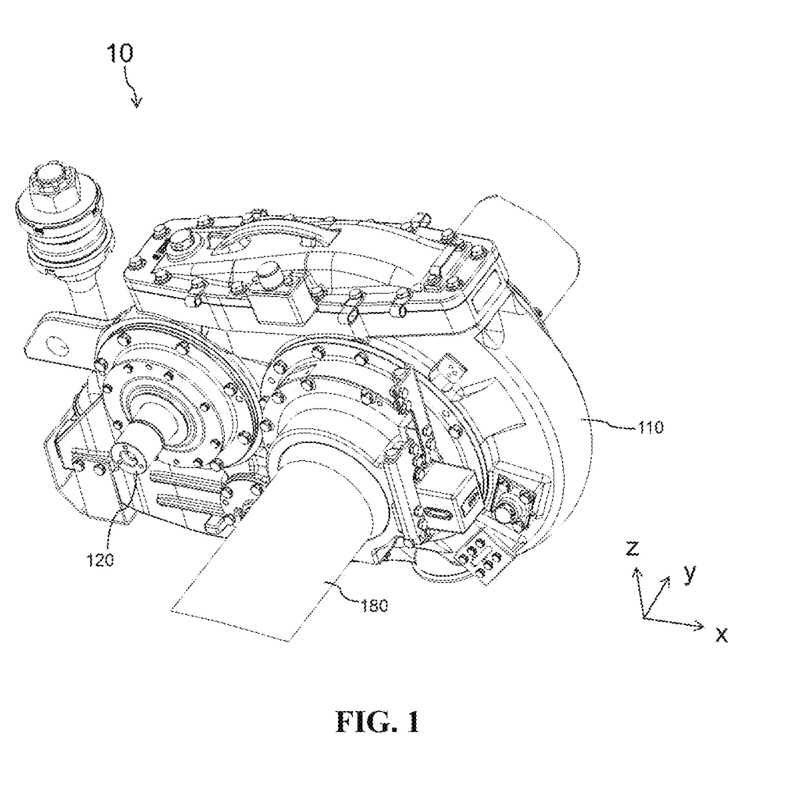
FIG. 1 is a schematic diagram of a three-dimensional structure of a gearbox according to an embodiment of the present invention.
Figure 2:
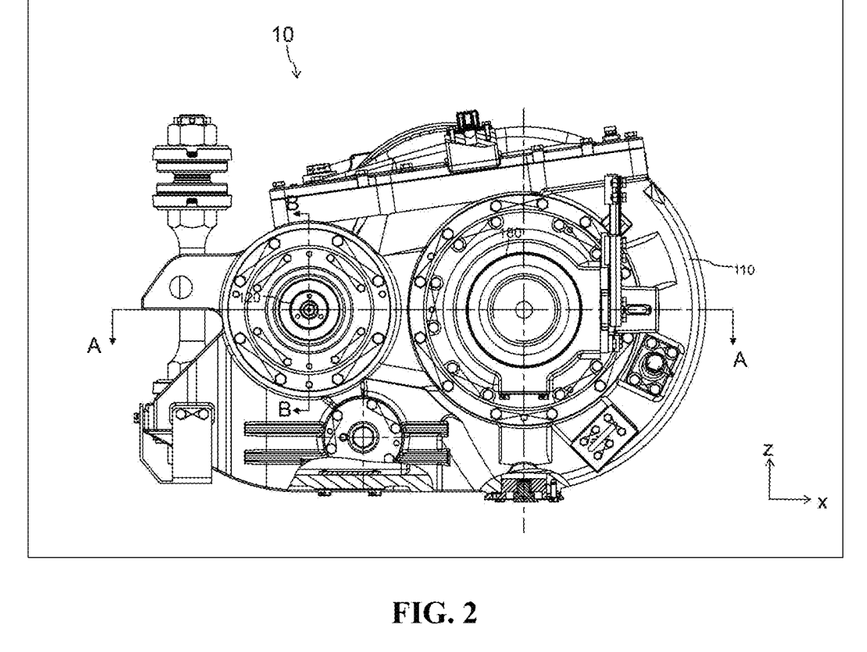
FIG. 2 is a front view of the gearbox shown in FIG. 1.
Figure 3:
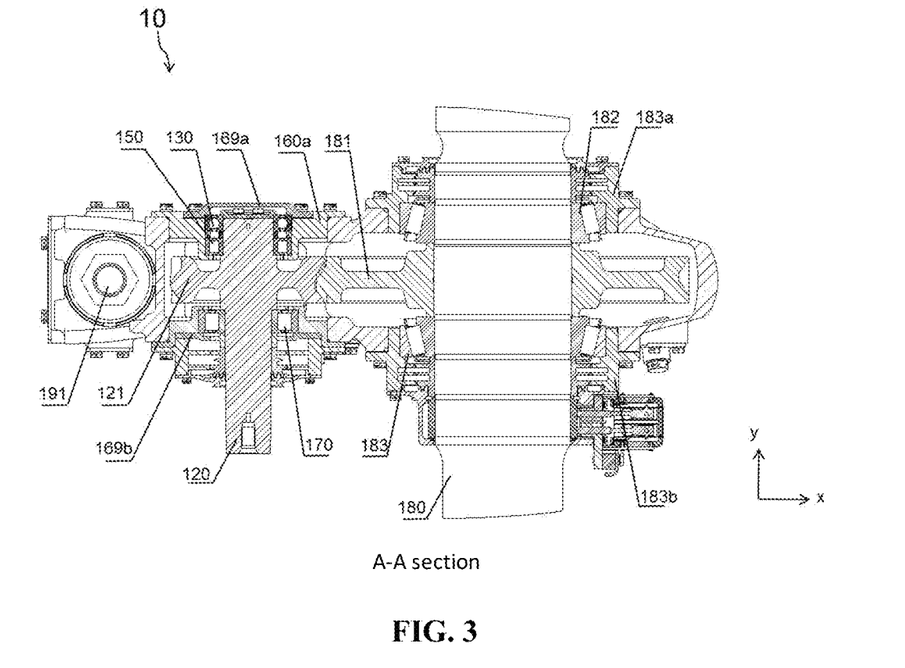
FIG. 3 is an A-A sectional view of the gearbox shown in FIG. 2.
Figure 4:
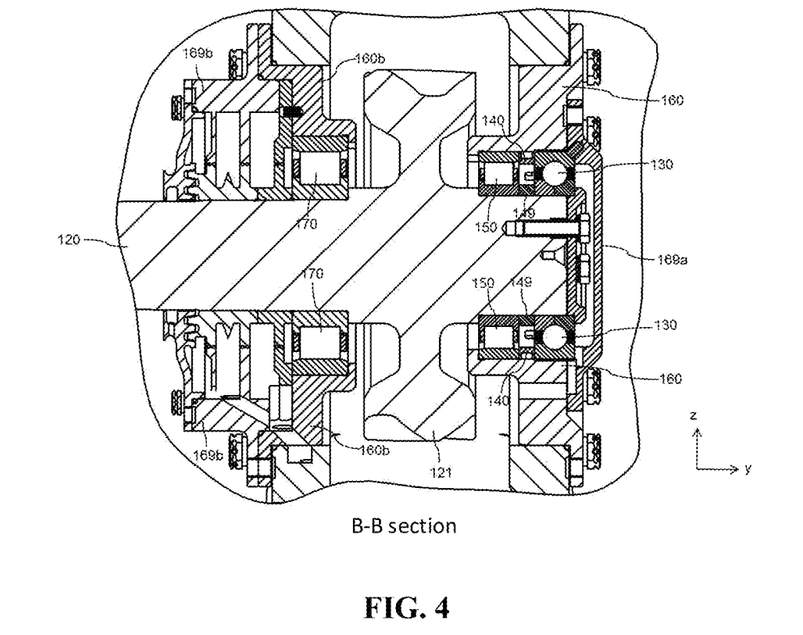
FIG. 4 is a B-B sectional view of the gearbox shown in FIG. 2.
Figure 5:
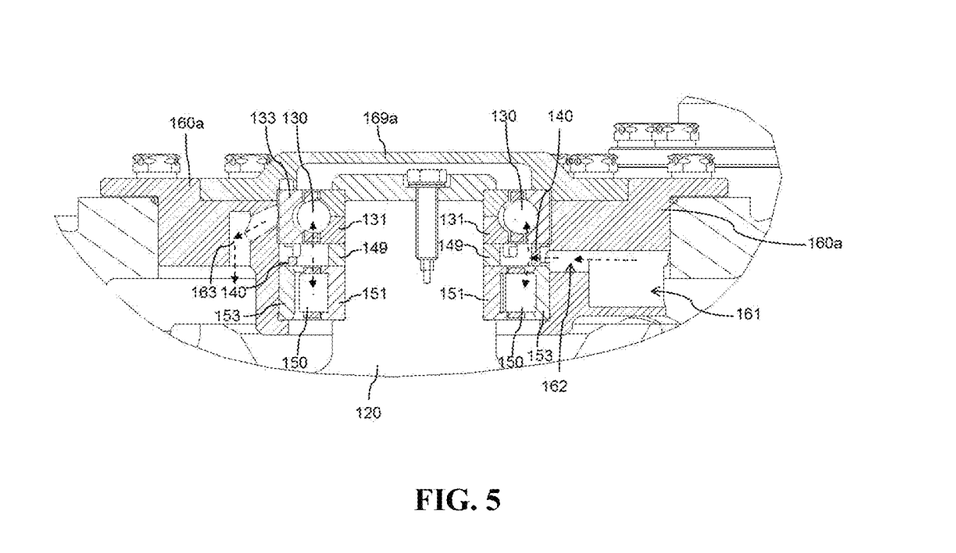
FIG. 5 is a partial enlarged view of the bearing arrangement of the gearbox shown in FIG. 1.
Figure 6:
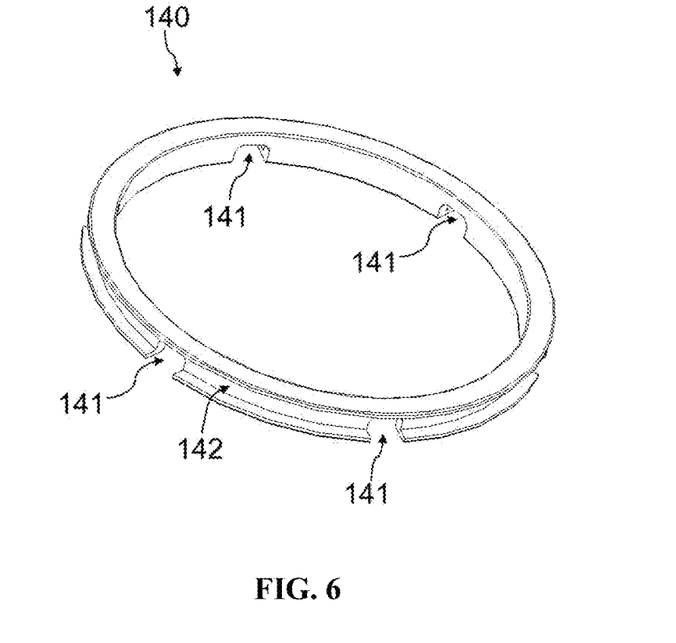
FIG. 6 is a structural diagram of a bearing outer retaining ring for drainage used in the gearbox shown in FIG. 1.
Figure 7:
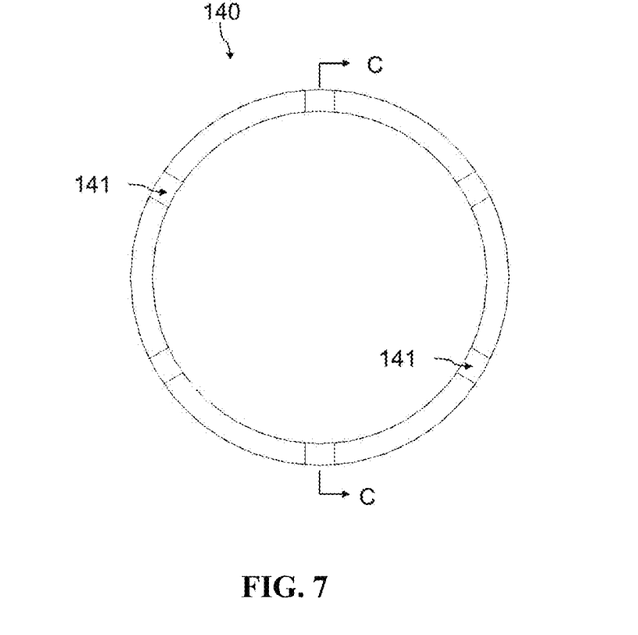
FIG. 7 is a front view of the bearing outer retaining ring shown in FIG. 6.
Figure 8:
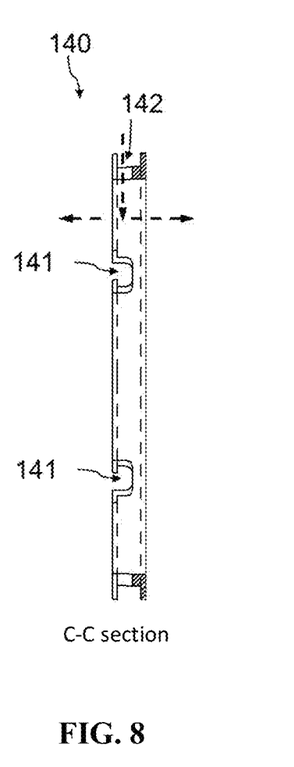
FIG. 8 is a C-C sectional view of the bearing outer retaining ring shown in FIG. 7.

FIG. 1 is a schematic diagram of a three-dimensional structure of a gearbox according to an embodiment of the present invention; FIG. 2 is a front view of the gearbox shown in FIG. 1; FIG. 3 is an A-A sectional view of the gearbox shown in FIG. 2; FIG. 4 is a B-B sectional view of the gearbox shown in FIG. 2; FIG. 5 is a partial enlarged view of the bearing arrangement of the gearbox shown in FIG. 1; FIG. 6 is a structural diagram of a bearing outer retaining ring for drainage used in the gearbox shown in FIG. 1; FIG. 7 is a front view of the bearing outer retaining ring shown in FIG. 6; FIG. 8 is a C-C sectional view of the bearing outer retaining ring shown in FIG. 7. A gearbox 10 according to an embodiment of the present invention will be illustrated below with reference to FIGS. 1 to 8.

The gearbox 10 of a rail vehicle in the following example is used to realize transmission in the rail vehicle, which can transmit the power output by a traction motor to the wheels, the gearbox 10 can be installed in a wheel pair device, for example, by means of a boom assembly 191 of the gearbox 10 and the like, so as to realize the fixed installation of the gearbox; wherein, the traction motor has a relatively fast rotation speed, especially when the rail vehicle is a high-speed EMU.

The gearbox 10 comprises a box body 110 with relatively complicated structures and components arranged inside. In order to facilitate and clearly describe the improvements of the gearbox 10 of the embodiment of the present invention, only the parts and components and arrangements thereof relating to the main improvements of the present invention are described in detail.

The gearbox 10 may be provided with a driving shaft 120 and a driven shaft 180, the driving shaft 120 and the driven shaft 180 are arranged in parallel along the y-direction, and may penetrate the box body 110, the driving shaft 120 is coupled with the traction motor located on a motor side of the gearbox 10 and driven by the traction motor to rotate synchronously, the driven shaft 180 is used as an axle located on a wheel side of the gearbox 10 and can drive the wheels to rotate synchronously; the driving shaft 120 may specifically be a gear shaft, a small gear 121 is integrally provided on the gear shaft, and a large gear 181 is fixedly installed on the driven shaft 180; the small gear 121 meshes with the large gear 181, so that the driving shaft 120 drives the driven shaft 180 to rotate through gear transmission.

The specific gear transmission ratio between the small gear 121 and the large gear 181 is not restrictive. In other alternative embodiments, an intermediate shaft and an intermediate gear can also be arranged between the small gear 121 and the large gear 181, and they can be used for intermediate transmission.

As shown in FIGS. 3 to 5, the gearbox 10 is also fixedly provided with a first bearing seat 169 and a second bearing seat 183; wherein, the first bearing seat 169 is provided corresponding to the driving shaft 120, which is used to install and fix the driving shaft 120. For example, a bearing seat 169a of the first bearing seat 169 is arranged corresponding to a first end of the driving shaft 120 (close to an end of wheel side) and is used to support the corresponding bearing assembly and the first end of the driving shaft 120, a bearing seat 169b of the first bearing seat 169 is arranged corresponding to a second end of the driving shaft 120 (close to an end of motor side) and is used to support the corresponding bearing assembly and the second end of the driving shaft 120; a bearing seat 183a of the second bearing seat 183 is arranged corresponding to a first end of the driven shaft 180 (close to the end of wheel side) and is used to support the corresponding bearing assembly and the first end of the driven shaft 180, a bearing seat 183b of the second bearing seat 183 is arranged corresponding to a second end of the driven shaft 180 (close to the end of motor side) and is used to support the corresponding bearing assembly and the second end of the driven shaft 180.

Continuing as shown in FIGS. 3 to 5, both the driving shaft 120 and the driven shaft 180 have corresponding bearing arrangements, especially for the driving shaft 120 with a relatively fast rotation speed. Corresponding to the driving shaft 120, its bearing configuration comprises a first roller bearing 150, a ball bearing 130, and in particular also comprises a bearing inner retaining ring 149 and a bearing outer retaining ring 140 for drainage. Wherein, the first roller bearing 150, the ball bearing 130, the bearing inner retaining ring 149 and the bearing outer retaining ring 140 are arranged between a bearing seat 160a and the first end of the driving shaft 120, and the bearing inner retaining ring 149 and the bearing outer retaining ring 140 are arranged between the first roller bearing 150 and the ball bearing 130 along the axial direction of the driving shaft 120 (that is, the y-direction), in this way, the bearing inner retaining ring 149 and the bearing outer retaining ring 140 can separate the first roller bearing 150 on the driving shaft 120 from the ball bearing 130 in the y-direction.

Specifically, as shown in FIGS. 4 and 5, the inner diameter of the bearing inner retaining ring 149 is smaller than the inner diameter of the bearing outer retaining ring 140, and the bearing inner retaining ring 149 and the bearing outer retaining ring 140 are arranged concentrically with respect to the driving shaft 120. The bearing inner retaining ring 149 can be arranged corresponding to an inner ring 151 of the first roller bearing 150 (or referred as the "inner retaining ring") and an inner ring 131 of the ball bearing 130 and separate them, for example, the two side surfaces of bearing inner retaining ring 149 respectively abut the end surfaces of the inner ring 151 of the first roller bearing 150 and the inner ring 131 of the ball bearing 130; in this way, when the driving shaft 120 rotates, the inner ring 151, the bearing inner retaining ring 149 and the inner ring 131 arranged in the y-direction on the driving shaft 120 in sequence will rotate synchronously with the driving shaft 120. The bearing outer retaining ring 140 can be arranged corresponding to an outer ring 153 of the first roller bearing 150 and an outer ring 133 of the ball bearing 130 and separate them, for example, the two side surfaces of bearing outer retaining ring 140 respectively abut the end surfaces of the outer ring 153 of the first roller bearing 150 and an inner ring 133 of the ball bearing 130; in this way, when the driving shaft 120 rotates, the outer ring 153, the bearing outer retaining ring 140 and the outer ring 133 arranged in the y-direction on the driving shaft 120 in sequence will be fixed on the bearing seat 160a, at this time, the bearing inner retaining ring 149 also rotates relative to the bearing outer retaining ring 140.

The bearing inner retaining ring 149 and the bearing outer retaining ring 140 may have substantially same width, that is, the width in the y-direction is the same. For example, the width of the bearing inner retaining ring 149 and the bearing outer retaining ring 140 may be greater than or equal to 5 mm, less than or equal to 15 mm (for example, 10 mm).

The gearbox 10 of a rail vehicle in the following example is used to realize transmission in the rail vehicle, which can transmit the power output by a traction motor to the wheels, the gearbox 10 can be installed in a wheel pair device, for example, by means of a boom assembly 191 of the gearbox 10 and the like, so as to realize the fixed installation of the gearbox; wherein, the traction motor has a relatively fast rotation speed, especially when the rail vehicle is a high-speed. Electric Multiple Unit (EMU).

It should be noted that the first roller bearing 150 and the second roller bearing 170 can mainly bear a radial force, and the ball bearing 130 can mainly bear an axial force. The first roller bearing 150 and the second roller bearing 170 may be specifically, but not limited to cylindrical roller bearings, and the ball bearing 130 may be, for example, but not limited to a four-point contact ball bearing.

For the bearing arrangement of the driven shaft 180, tapered roller bearings 182 and 183 are arranged correspondingly to both ends of the driven shaft 180 respectively, the tapered roller bearing 182 is installed and fixed by the second bearing seat 183a on the wheel side, the tapered roller bearing 183 is installed and fixed by the second bearing seat 183b on the motor side.

It should be understood that the bearings of the driven shaft 180 and the bearings of the driving bearing 120 both have lubrication requirements during the operation of the gearbox 10, especially for the bearings of the driving bearing 120 that rotate at a high speed, its lubrication requirements are extremely high. To this end, in an embodiment of the present invention, as shown in FIG. 5, a second drainage channel 162 is provided on the first bearing seat 160a, and as shown in FIGS. 6-8, a first drainage channel is provided on the bearing outer retaining ring 140. As indicated by the dashed arrow in FIG. 5, the lubricating oil can be guided into the first roller bearing 150 and/or the ball bearing 130 from the outside of the first bearing seat 160a through the second drainage channel 162 on the first bearing seat 160a and the first drainage channel on the bearing outer retaining ring 140 in sequence.

As shown in FIGS. 3 to 5, the gearbox 10 is also fixedly provided with a first bearing seat 160 and a second bearing seat 183; wherein, the first bearing seat 160 is provided corresponding to the driving shaft 120, which is used to install and fix the driving shaft 120. For example, a bearing seat 160a of the first bearing seat 160 is arranged corresponding to a first end of the driving shaft 120 (close to an end of wheel side) and is used to support the corresponding bearing assembly and the first end of the driving shaft 120, a bearing seat 160b of the first bearing seat 160 is arranged corresponding to a second end of the driving shaft 120 (close to an end of motor side) and is used to support the corresponding bearing assembly and the second end of the driving shaft 120; a bearing seat 183a of the second bearing seat 183 is arranged corresponding to a first end of the driven shaft 180 (close to the end of wheel side) and is used to support the corresponding bearing assembly and the first end of the driven shaft 180, a bearing seat 183b of the second bearing seat 183 is arranged corresponding to a second end of the driven shaft 180 (close to the end of motor side) and is used to support the corresponding bearing assembly and the second end of the driven shaft 180.

By setting the inclination and/or angle of the second drainage channel 162, at least part of the lubricating oil in the oil collecting groove 161 can automatically flow into the first drainage channel of the bearing outer retaining ring 140. Specifically, the second drainage channel 162 may be constructed such that one end thereof is inclined to the inside of the oil collecting groove 161 capable of collecting lubricating oil, and the other end thereof is inclined at an angle aligned with the bearing outer retaining ring 140. It will be understood that the specific arrangement of the second drainage channel 162 is not restrictive; in other embodiments, the second drainage channel 162 may also be provided integrally with the oil collecting groove 161.

In one embodiment, as shown in FIGS. 6 to 8, the first drainage channel of the bearing outer retaining ring 140 comprises a plurality of drainage holes 141. Specifically, the plurality of drainage holes 141 may be evenly distributed in a circumferential direction of the bearing outer retaining ring 140, which helps to achieve even lubrication in the circumferential direction of the bearing. In one embodiment, a shunt groove 142 is provided on an outer peripheral surface of the bearing outer retaining ring 140, and the shunt grooves are provided corresponding to the inlets of the plurality of drainage holes 141, so that the lubricating oil flowing from the second drain channel 162 can be divided into the plurality of drainage holes 141 substantially evenly. Specifically, when the lubricating oil flows from the second drainage channel 162 to the bearing outer retaining ring 140, the shunt groove 142 will guide the lubricating oil to flow in the circumferential direction, so that the lubricating oil enters the plurality of drainage holes 141 evenly distributed in the circumferential direction. In addition, in actual use, the first roller bearing 150 and the ball bearing 130 can also be arranged at the same height in the radial direction, which will help to divide the lubricating oil into the first roller bearing 150 and the ball bearing 130 in a predetermined proportion, for example, the introduced lubricating oil is divided substantially evenly into the first roller bearing 150 and the ball bearing 130 on both sides of the bearing outer retaining ring 140.

In one embodiment, any structure such as holes may not be provided on the bearing inner retaining ring 149, so as to prevent the drained lubricating oil from flowing out, and the bearing inner retaining ring 149 can also be realized at a relatively low cost. The rotation of the bearing inner retaining ring 149 can also guide the lubricating oil flowing from one side of the oil collecting groove 161 to flow in the circumferential direction, so that the lubricating oil is substantially evenly distributed in the circumferential direction of the bearing, the first roller bearing 150 and the ball bearing 130 are also evenly introduced with the lubricating oil in the circumferential direction.

In one embodiment, continuing as shown in FIG. 5, a third drainage channel 163 is also provided on the first bearing seat 160a, wherein the lubricating oil in the first roller bearing 150 and the ball bearing 130 (for example, redundant lubrication oil) can be discharged into the inside of the gearbox 10 through the third drainage passage 163. In this way, combined with the introduction of lubricating oil by the first drainage channel and the second drainage channel 162 and the discharge of lubricating oil by the third drainage channel 163, at least part of the lubricating oil can circulate in the first roller bearing 150 or the ball bearing 130, which can take more heat generated by the first roller bearing 150 or the ball bearing 130 during high-speed rotation away, and the lubrication effect is better.

Specifically, the third drainage channel 163 is arranged on a side opposite to the second drainage channel 162 on the first bearing seat 160a, so that the lubricating oil can flow in from the side close to the large gear 181 and flow out from the side far away from the large gear 181.

The above-exemplified lubricating method for the first roller bearing 150 and the ball bearing 130 can greatly improve the lubricating performance of the first roller bearing 150 and the ball bearing 130, especially when the gearbox 10 is in a low-temperature starting working condition, which can ensure that the flowing lubricating oil enters the first roller bearing 150 and the ball bearing 130 in time, and prevent factors such as reduced fluidity of the lubricating oil in the first roller bearing 150 and the ball bearing 130 during low-temperature startup from causing poor lubrication and burning gears. Therefore, for the gearbox 10 of the above embodiment, both the first roller bearing 150 and the ball bearing 130 can be fully lubricated under high and low temperature working conditions, and the temperature rise and bearing condition of the first roller bearing 150 and the ball bearing 130 are both good. As a result, the gearbox 10 of the above embodiment is especially suitable for high-speed working conditions, for example, installation and application on high-speed Electric Multiple Units (EMUs) with speeds exceeding 200 km/h.

Continuing as shown in FIGS. 3 to 5, the outer sides of the first end and the second end of the driving shaft 120 are respectively arranged with bearing seal assemblies. For example, a sealing cover 169a is arranged next to the bearing seat 160a corresponding to the first end of the driving shaft 120, and a sealing cover 169b is arranged next to the bearing seat 160b corresponding to the second end of the driving shaft 120, the sealing cover 169a and sealing cover 169b can prevent the lubricating oil from flowing out of the inside of the gearbox 10. Of course, bearing seal assemblies can also be provided corresponding to the outer sides of the two ends of the driven shaft 180 respectively, and their specific arrangement is not restrictive.

It should be noted that although the lubricating method of the first roller bearing 150 and the ball bearing 130 of the driving shaft 120 is described above as an example, this is because the first roller bearing 150 and the ball bearing 130 have relatively higher requirements for lubricating performance, and the bearing inner retaining ring 149 and the bearing outer retaining ring 140 can be arranged conveniently by using the gap between them. In other embodiments, if the second end of the driving shaft 120 (the end close to the motor side) also needs to arrange bearing according to the first end thereof, the bearing inner retaining ring 149, the bearing outer retaining ring 140, the second drainage channel 162 and so on can also be arranged in the same or similar manner, thereby also obtain the same or similar lubrication effect.

It should be noted that the lubricating oil can be various liquid lubricants that can be used in the gearbox.

The above examples mainly illustrate the gearbox of the present disclosure and the rail vehicle using it. Although only some of the embodiments of the present invention have been described, the skilled in the art should understand that the present invention can be implemented in many other forms without departing from its spirit and scope. Therefore, the examples and implementations shown are regarded as illustrative rather than restrictive, the present invention may cover various modifications and replacement without departing from the spirit and scope of the present invention as defined by the appended claims.

The invention claimed is:

1. A gearbox for a rail vehicle, comprising a driving shaft, a driven shaft, a first bearing seat for mounting and fixing the driving shaft, and a second bearing seat for mounting and fixing the driven shaft, the driving shaft drives the driven shaft to rotate through gear transmission; characterized in that, the gearbox further comprises:
    a first roller bearing, a ball bearing, a bearing inner retaining ring and a bearing outer retaining ring for drainage, which are arranged between the first bearing seat and the driving shaft;
    wherein, the bearing inner retaining ring and the bearing outer retaining ring are provided between the first roller bearing and the ball bearing along an axial direction of the driving shaft, and a first drainage channel is provided on the bearing outer retaining ring, a second drainage channel is provided on the first bearing seat;
    wherein, lubricating oil can be guided into the first roller bearing and the ball bearing from the outside of the first bearing seat through the second drainage channel and the first drainage channel in sequence;
    wherein the first drainage channel of the bearing outer retaining ring comprises a plurality of drainage holes; a shunt groove is also provided on the bearing outer retaining ring, the shunt groove is used to divide the lubricating oil flowing from the second drainage channel into the plurality of drainage holes substantially evenly; and
    wherein a third drainage channel is provided on the first bearing seat and extends from an outer ring of the ball bearing, such that the lubricating oil in the first roller bearing and the ball bearing is discharged into the gearbox through the third drainage channel.

2. The gearbox of claim 1, characterized in that, an oil collecting groove is provided on the first bearing seat and/or a box body of the gearbox, an opening of one end of the second drainage channel faces towards the oil collecting groove, the oil collecting groove is used for collecting the lubricating oil accumulated in the gearbox which is dragged by a gear on the driven shaft when it rotates, the gear on the driven shaft functions as a driven gear in the gear transmission between the driving shaft and the driven shaft.

3. The gearbox of claim 2, characterized in that, an opening of another end of the second drainage channel substantially faces towards the bearing outer retaining ring, and an inclination direction and/or angle of the second drainage channel is set so that the lubricating oil in the oil collecting groove automatically flows into the second drainage channel of the bearing outer retaining ring.

4. The gearbox of claim 1, characterized in that, the third drainage channel is provided on a side opposite to the second drainage channel on the first bearing seat.

5. The gearbox of claim 1, characterized in that, the bearing inner retaining ring and the bearing outer retaining ring are arranged concentrically, wherein, the bearing inner retaining ring is arranged corresponding to an inner ring of the first roller bearing and an inner ring of the ball bearing and separates them, and the bearing outer retaining ring is arranged corresponding to the outer ring of the first roller bearing and an outer ring of the ball bearing and separates them.

6. The gearbox of claim 5, characterized in that, the bearing inner retaining ring, the inner ring of the first roller bearing and the inner ring of the ball bearing are all fixed on the driving shaft and rotate synchronously with the driving shaft.

7. The gearbox of claim 1, characterized in that, the plurality of drainage holes are substantially evenly distributed in a circumferential direction of the bearing outer retaining ring.

8. The gearbox of claim 1, characterized in that, the shunt groove is a groove provided on an outer circumferential surface of the bearing outer retaining ring.

9. The gearbox of claim 1, characterized in that, the first roller bearing and the ball bearing mounted on the driving shaft are arranged at substantially the same height in a radial direction.

10. The gearbox of claim 1, characterized in that, the bearing inner retaining ring is fixed on a first end of the driving shaft at a wheel side.

11. The gearbox of claim 1, characterized in that, the ball bearing is arranged on an outer side relative to the first roller bearing along the axial direction of the driving shaft.

12. The gearbox of claim 11, characterized in that, the first roller bearing and the second roller bearing are cylindrical roller bearings.

13. The gearbox of claim 1, characterized in that, a second roller bearing is correspondingly arranged at a second end of the driving shaft at a motor side.

14. The gearbox of claim 1, characterized in that, further comprising:
    bearing seal assemblies arranged outside a first end and a second end of the driving shaft respectively.

15. A rail vehicle, characterized in that, the rail vehicle uses the gearbox according to claim 1.

* * * * *